(12) United States Patent
Perumal et al.

(10) Patent No.: US 9,922,094 B1
(45) Date of Patent: Mar. 20, 2018

(54) SHARING DATA BASED ON USER RANKING

(71) Applicant: Symantec Corporation, Mountain View, CA (US)

(72) Inventors: Vijay Bhaskar Perumal, Los Angeles, CA (US); Charles A. Payne, Los Angeles, CA (US); Garret Polk, Northridge, CA (US); Charles Trinh, Anaheim, CA (US)

(73) Assignee: Symantec Corporation, Mountain View, CA (US)

( * ) Notice: Subject to any disclaimer, the term of this patent is extended or adjusted under 35 U.S.C. 154(b) by 338 days.

(21) Appl. No.: 14/308,520

(22) Filed: Jun. 18, 2014

(51) Int. Cl.
*G06F 17/30* (2006.01)
*H04W 4/02* (2018.01)

(52) U.S. Cl.
CPC ...... *G06F 17/3053* (2013.01); *G06F 17/3087* (2013.01); *G06F 17/30165* (2013.01); *G06F 17/30241* (2013.01); *G06F 17/30864* (2013.01); *G06F 17/30867* (2013.01); *H04W 4/02* (2013.01)

(58) Field of Classification Search
CPC ........... G06F 17/30864; G06F 17/3053; G06F 17/30598; G06F 17/30873; G06F 17/3089; G06Q 50/01; G06Q 30/0631
USPC ................ 707/748, 722, 724, 732, 749, 758
See application file for complete search history.

(56) References Cited

U.S. PATENT DOCUMENTS

| | | | | |
|---|---|---|---|---|
| 8,060,018 B2 * | 11/2011 | Davis | ................... | H04W 84/18 455/41.2 |
| 8,200,681 B2 * | 6/2012 | Hedge | ............... | G06F 17/30029 707/758 |
| 8,312,392 B2 * | 11/2012 | Forutanpour | ......... | G06F 1/1694 715/733 |
| 8,473,200 B1 * | 6/2013 | Manber | .............. | G01C 21/3644 340/990 |
| 8,914,044 B2 * | 12/2014 | Raman | .................. | H04W 4/021 455/456.1 |
| 8,972,402 B1 * | 3/2015 | Gupte | ............... | G06F 17/30038 705/26.7 |
| 9,160,786 B1 * | 10/2015 | Jackson | .................. | H04L 67/06 |
| 9,323,850 B1 * | 4/2016 | Lewis | ............... | G06F 17/30867 |
| 9,338,242 B1 * | 5/2016 | Suchland | ................ | H04L 67/22 |
| 9,349,282 B2 * | 5/2016 | Luna | ........................ | H04R 3/00 |
| 9,537,950 B2 * | 1/2017 | Ibasco | .................... | G06Q 30/02 |

(Continued)

FOREIGN PATENT DOCUMENTS

EP  1534037  5/2005

OTHER PUBLICATIONS

Dropbox, How do I share folders with other people?, available from https://www.dropbox.com/help/19/en, as early as Sep. 2013.

(Continued)

*Primary Examiner* — Dangelino N Gortayo
(74) *Attorney, Agent, or Firm* — Holland & Hart LLP (57) ABSTRACT

A method for sharing data based on user ranking is described. In one embodiment, the method includes determining a location of a computing device, identifying a request to share data from the computing device with one or more other computing devices, and ranking potential recipients of the data from the computing device based on at least one of location data, network communication data, and contact information.

16 Claims, 7 Drawing Sheets

(56) References Cited

U.S. PATENT DOCUMENTS

| | | | | |
|---|---|---|---|---|
| 2003/0236832 A1* | 12/2003 | McIntyre | ............... | H04L 29/06 |
| | | | | 709/204 |
| 2012/0317135 A1* | 12/2012 | Jin | ................... | G06F 17/30165 |
| | | | | 707/769 |
| 2013/0159331 A1* | 6/2013 | Zhang | .............. | G06F 17/30241 |
| | | | | 707/758 |
| 2013/0339358 A1* | 12/2013 | Huibers | ........... | G06F 17/30165 |
| | | | | 707/737 |
| 2015/0081783 A1* | 3/2015 | Gong | ..................... | H04L 65/60 |
| | | | | 709/204 |
| 2015/0094037 A1* | 4/2015 | Jung | .................. | G06F 21/6218 |
| | | | | 455/414.1 |

OTHER PUBLICATIONS

Bump, Bump mobile app, available from https://bu.mp/, as early as Sep. 2013.
Chirp.io, Chirp mobile app, available from http://chirp.io/, as early as Sep. 2013.
Apple, Inc., iOS: Use AirDrop to wirelessly share content, available from http://support.apple.com/kb/HT5887, as early as Sep. 2013.

* cited by examiner

System Rankings — 400

| System | Distance | Available Networks | Contact Info |
|---|---|---|---|
| 1. System C | < 15 m | Same Bluetooth network; Same Wi-Fi network; | Recent text message; |
| 2. System D | < 15 m | Same Wi-Fi network; | Matching phone number; |
| 3. System A | < 30 m | Same Wi-Fi network; | Matching email; |
| ⋮ | ⋮ | ⋮ | ⋮ |
| N. System B | < 150 m | No matching networks; | Social media contact; |

SHARING DATA BASED ON USER RANKING

BACKGROUND

Advancements in media delivery systems and data-related technologies continue to increase at a rapid pace. Increasing demand for accessible data has influenced the advances made to data-related technologies. Computer systems have increasingly become an integral part of data creation, data usage, and data storage. Computer systems may be used to carry out several data-related functions. The wide-spread access to data has been accelerated by the increased use of computer networks, including the Internet and cloud networking.

Many homes and businesses use one or more computer networks to generate, deliver, and receive data and information between the various computers connected to computer networks. Users of computer technologies continue to demand increased access to information and an increase in the efficiency of these technologies. Improving the efficiency of computer technologies is desirable to those who use and rely on computers.

With the wide-spread use of computers and mobile devices has come an increased presence of and continued advancements in data communication systems. For example, advancements in mobile devices allow users to share data with others from anywhere in the world. Nevertheless, benefits may be realized by providing systems and methods for improving data communication systems.

SUMMARY

According to at least one embodiment, a method for sharing data based on user ranking is described. In one embodiment, the method may include determining a location of a computing device, identifying a request to share data from the computing device with one or more other computing devices, and ranking potential recipients of the data from the computing device based on at least one of location data, network communication data, and contact information.

In some embodiments, the method may include generating a list of potential recipients based at least in part on the ranking of the one or more potential recipients and populating the list of potential recipients based at least in part on a time stamp of the request. In some cases, the method may include querying the contact information associated with the computing device. The contact information may include any combination of address book contact information, call history information, text message history information, social media contact information, and a degree of interaction between a user of the computing device and a contact.

In one embodiment, the method may include any combination of populating the list of potential recipients based at least in part on a match between the contact information associated with the computing device and a potential recipient, populating the list of potential recipients based at least in part on an estimated distance between the computing device and a potential recipient, and populating the list of potential recipients based at least in part on a media share history of the computing device in relation to a potential recipient.

Additionally, or alternatively, the method may include populating the list of potential recipients based at least in part on one or more available networks within the detectable range of the computing device, and/or populating the list of potential recipients based at least in part on one or more available networks within a detectable range of a potential recipient. In some embodiments, the information regarding the one or more available networks includes at least one of a signal strength associated with the available network, a cellular tower identifier, a Wi-Fi media access control (MAC) address, and a Bluetooth MAC address. In some cases the method may include displaying the list of potential recipients on the computing device and sending the data from the computing device to the one or more potential candidates selected from the list of potential recipients.

A computing device configured for sharing data based on user ranking is also described. The computing device may include a processor and memory in electronic communication with the processor. The memory may store computer executable instructions that when executed by the processor cause the processor to perform the steps of determining a location of a computing device, identifying a request to share data from the computing device with one or more other computing devices, and ranking potential recipients of the data from the computing device based on at least one of location data, network communication data, and contact information.

A non-transitory computer-readable storage medium storing computer executable instructions is also described. When the instructions are executed by a processor, the execution of the instructions may cause the processor to perform the steps of determining a location of a computing device, identifying a request to share data from the computing device with one or more other computing devices, and ranking potential recipients of the data from the computing device based on at least one of location data, network communication data, and contact information.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The systems and methods described herein relate to sharing data. More specifically, the systems and methods described herein relate to sharing data based on user ranking in relation to detectable metadata associated with the sharer and/or receiver of the shared data. Some embodiments of the systems and methods described herein relate to sharing data based on user ranking in relation to device location, contact information, available data communication networks, and the like.

In one example, when a person with a mobile device desires to share a media with another person or group of people, he or she may share the media by near-field communication (NFC), BLUETOOTH®, Wi-Fi, etc. Existing methods of data sharing, however require turning on sensors, physically bringing the devices to close proximity, logging into email, launching cloud sync, sharing software, etc. These methods require more steps to accomplish the task than the systems and methods described herein. Existing methods also pose additional challenges such as timeouts in discovering nearby devices and fail to show a list potential recipients in a useful order. In the systems and methods described herein, each user registers with a central system via an application (a mobile application loaded on an APPLE® or ANDROID® smartphone, for example). When user elects to share data, the application automatically shows nearby potential recipients. The application automatically organizes the potential recipients in an order based on a ranking process. The ranking process uses information such as device contact time, geo location of the device, media access control (MAC) address of a network device (e.g., Wi-Fi router, BLUETOOTH® hub, etc.) connected to the computing device running the application, a list of Wi-Fi and BLUETOOTH® device MAC addresses visible and/or available to the computing device running the application, contextual information on the computing device such address book, call and text message history, social media history, degree of interaction between a user of a first computing device and a user of a second computing device. In some cases, the application may analyze a user's social networking sites contacts and their interaction in any given network.

In some embodiments, the systems and methods described herein may involve two or more people, each with a computing device (e.g., mobile device, laptop, desktop, server, etc.), a central server to register and network with users devices and the software agent (i.e., application) running on each user's device. Each user may install the software agent and register a user account with the central server. Each time the software agent is launched it may collect and analyze information. In some cases, the software agent may submit the information to a central server for analysis. The information collected may include geo-coordinates of a device's current location, MAC address of a router or gateway to which a device is currently connected, results of a network scan to discover nearby MAC addresses of available Wi-Fi routers and BLUETOOTH® devices, including associated signal strengths. The software agent may read the content of an address book to collect information such as phone numbers, email addresses, etc. In some cases, the software agent may send the available contact information to the central server upon initialization of the application. Thereafter, the software agent may synchronize the contact information, and other available data, on an on-going basis. In some cases, the software agent may read call history, text message history, and social media history, etc. Such information may include time stamp data associated with each call, message, and/or social media post. In some cases, the software agent may import user contacts from the social networking sites and email accounts such as FACEBOOK®, TWITTER®, LINKED-IN®, GMAIL®, etc. When the software agent sends data to the central server, the server may store the record along with any associated time stamps, including a time stamp of when the data is sent to the central server.

In some embodiments, the software agent and/or central server may find nearby devices and rank them in an order determined by the data gathered by the software agents of each device involved. A user ("sharer") may initiate a sharing of data by launching an application on a mobile device (e.g., software agent installed on a smartphone, etc.). The application may collect data as described above. The application and/or server may analyze the collected data. Based on the analysis, the application may identify nearby potential recipients of the data the sharer desires to share. The application may use the sharer's request time stamp minus delta seconds to identify the list of potential recipients. The application may calculate the distance between the sharer's coordinates and the coordinates of one or more other devices. Accordingly, the application may sort the list of potential recipients based on nearest distance to the sharer.

In one embodiment, the application may rank the list of potential recipients by scoring metadata associated with each potential recipient. For example, the application may review a media share history in association with each potential recipient. Each potential recipient may be scored based on a frequency and degree of interaction in relation to the sharer. Additionally, or alternatively, each potential recipient may be scored based on a recentness of interaction in relation to the sharer. In some cases, each potential recipient may be scored based on whether a potential recipient is connected to the same router as the sharer and/or whether an available network of a potential recipient includes the same router to which the sharer is connected. If the currently connected router's MAC address of the sharer and a potential recipient matches, then that potential recipient may receive a higher score, moving the potential recipient higher on the list. Additionally, or alternatively, if a match exists between one or more available networks (e.g., Wi-Fi, BLUETOOTH®, etc.) of the sharer match one or more available networks of a potential recipient, that potential recipient may receive a higher score than a potential recipient that contains no such matches. In some cases, upon finding two or more potential recipients with matching available networks, the score of each potential recipient may be weighted based on signal strength. If the signal strength associated with a first potential recipient exceeds that of a second potential recipient, the first potential recipient may receive a score higher than that of the second potential recipient.

In one embodiment, contact information associated with a potential recipient may match the contact information in an address book of the sharer. For example, the phone number of a potential recipient may match a phone number in the sharer's address book. A potential recipient with matching contact information may receive a higher score than a potential recipient with no matching contact information. In some embodiments, social network friends or followers of the sharer may be compared with the potential recipients. If the sharer and a potential recipient recently interacted (e.g. posted a message, liked a post, shared a post, re-tweeted a post, etc.) then such interaction may improve the potential recipient's score. As described above, the email history of the sharer may be analyzed in relation to the potential recipients. If there are interactions in email history such as messages sent, received, forwarded, etc., then such interaction may improve a potential recipient's score. Recentness also improves a score. Thus, a recent exchange (e.g., phone call, email, text message, social media post, etc.) between a potential recipient and the sharer may improve the score of the potential recipient. The application and/or server may use the scores to rank each potential recipient and list the potential recipients based on the calculated rank. The application may display the ranked list of potential recipients to the sharer, enabling the sharer select the one or more potential recipients with which to share the data. The application and/or server may then deliver the data to the one or more selected potential recipients. Although some of the examples above refer to the application performing one or more operations, in some cases, the application may perform any of the operations in conjunction with a central server. In some cases, the application or the server alone may perform any one of the operations described above.

Figure 1:
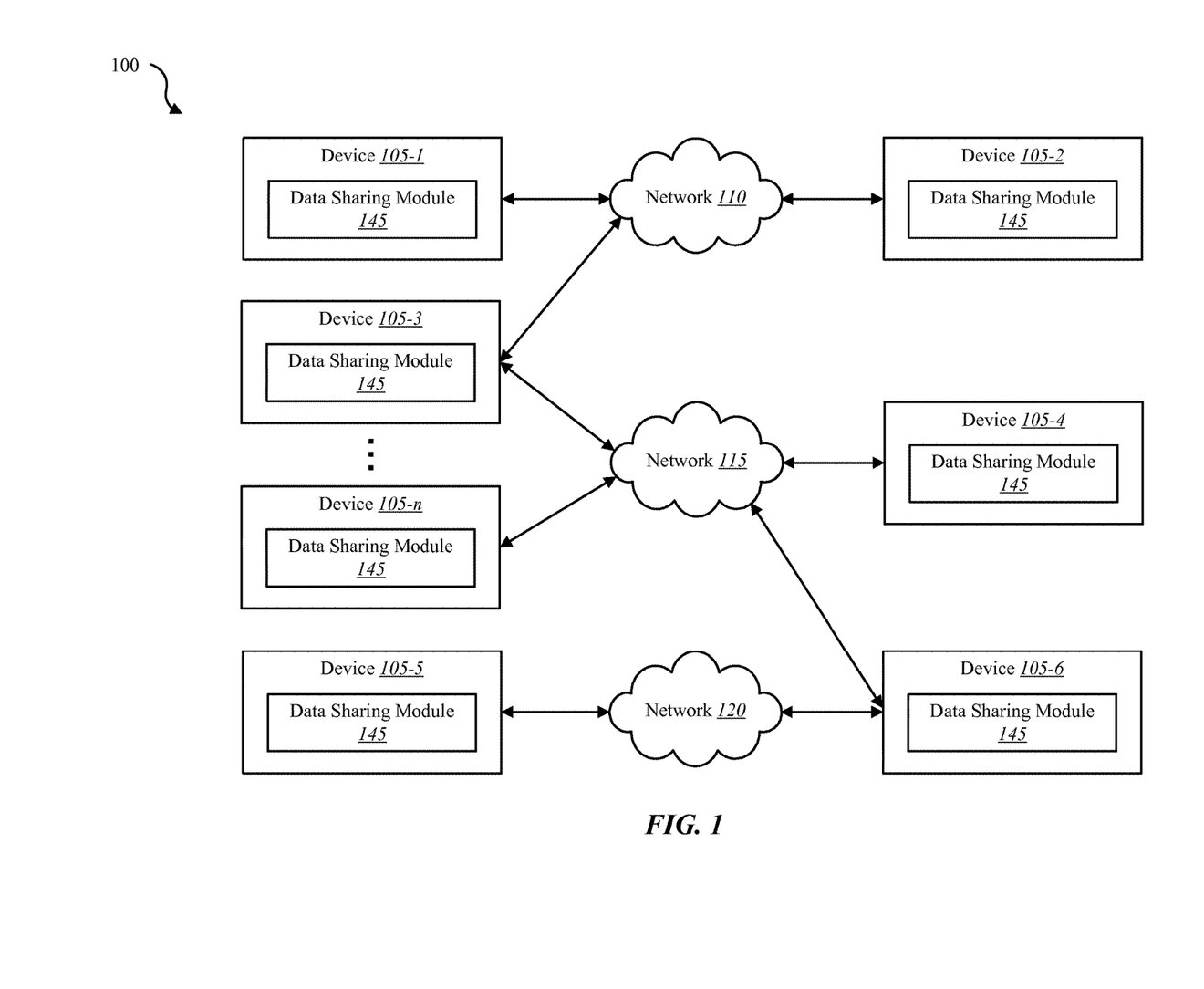
FIG. 1 is a block diagram illustrating one embodiment of an environment in which the present systems and methods may be implemented.

FIG. 1 is a block diagram illustrating one embodiment of an environment 100 in which the present systems and methods may be implemented. In some embodiments, the systems and methods described herein may be performed on a device (e.g., any of devices 105-1 through 105-$n$ as illustrated). As depicted, the environment 100 may include devices 105-1 through 105-$n$ and networks 110, 115, and 120. Networks 110, 115, and 120 may allow the devices 105 to communicate with one another. In some cases, networks 110, 115, and 120 may communicate with each other in a mesh network.

Examples of devices 105 may include any combination of mobile devices, smart phones, personal computing devices, computers, laptops, desktops, servers, media content set top boxes, satellite set top boxes, cable set top boxes, DVRs, personal video recorders (PVRs), etc. Example of networks 110, 115, 120 may include any combination of cloud networks, local area networks (LAN), wide area networks (WAN), virtual private networks (VPN), wireless networks (using 802.11, for example), cellular networks (using 3G and/or LTE, for example), etc. In some cases, any one of devices 105 may be configured as a Wi-Fi hotspot and/or a BLUETOOTH® connection. In some embodiments, any of networks 110, 115, 120 may provide a Wi-Fi connection (e.g., Wi-Fi access point, hotspot, etc.). Additionally, or alternatively, any one of networks 110, 115, 120 may provide a BLUETOOTH® connection. In some configurations, any one of networks 110, 115, 120 may include the Internet. In some cases, any one of devices 105 may be configured as a Wi-Fi hotspot and/or a BLUETOOTH® connection.

As illustrated, any one of devices 105 may include a data sharing module 145. Data sharing module 145 may enable the sharing of data based on user ranking. In some embodiments, data sharing module 145 may be configured to perform the systems and methods described herein in conjunction with an application loaded on a device 105. Further details regarding the data sharing module 145 are discussed below.

Figure 2:
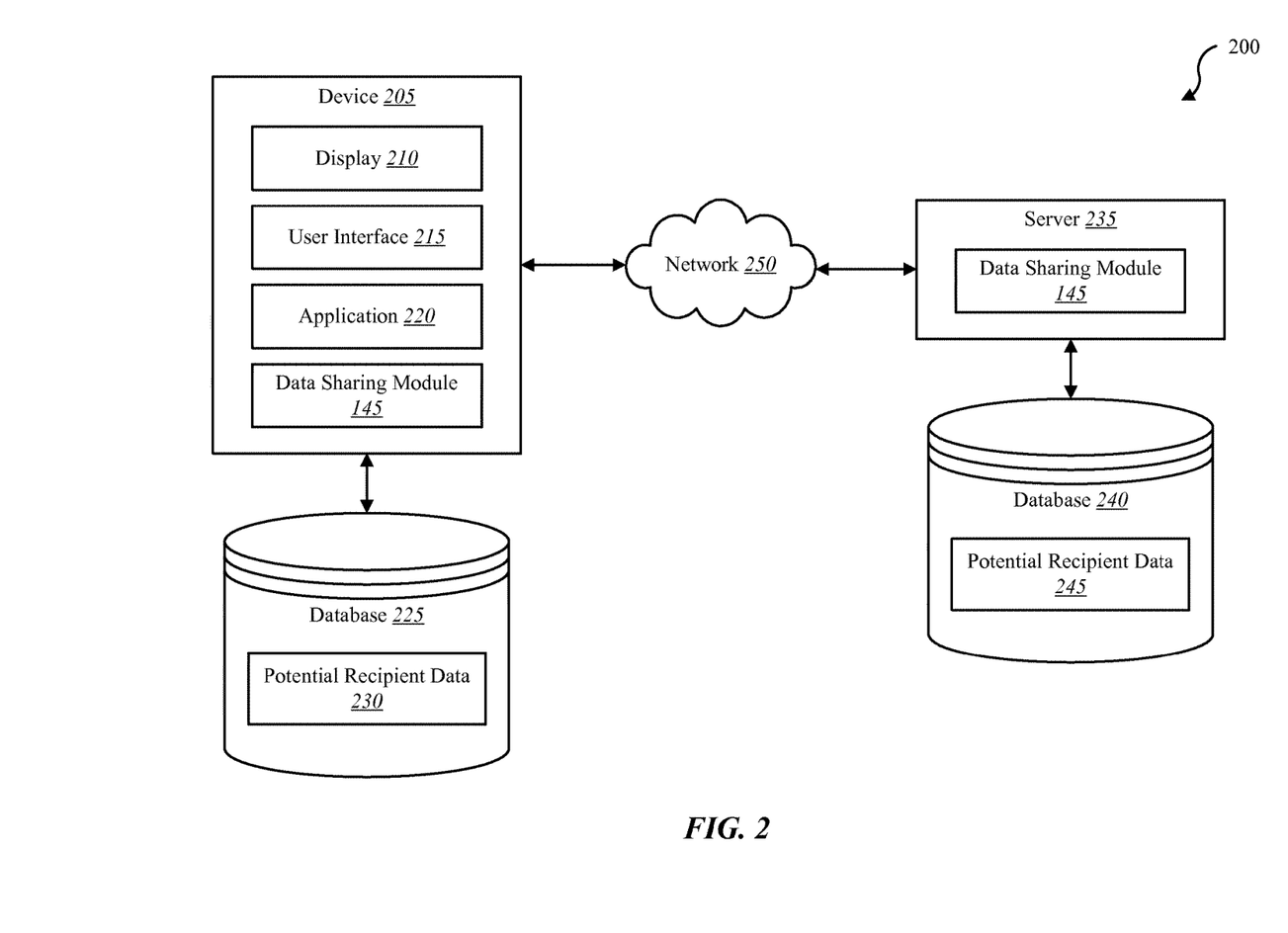
FIG. 2 is a block diagram illustrating one embodiment of an environment in which the present systems and methods may be implemented.

FIG. 2 is a block diagram illustrating one example of device 205. Device 205 may be one example of any one of devices 105-1 through 105-$n$ depicted in FIG. 1. As depicted, device 205 may include a display 210, a user interface 215, an application 220, and data sharing module 145. Although the components of the device 105 are depicted as being internal to the device 105, it is understood that one or more of the components may be external to the device 105 and/or connect to device 105 through wired and/or wireless connections (e.g., network 115, etc.). In some embodiments, application 220 may be installed on a computing device in order to allow a user to interface with a function of device 105, data sharing module 145, and/or server 235.

Examples of server 235 may include any combination of a data server, a cloud server, a server associated with an automation service provider, proxy server, mail server, web server, application server, database server, communications server, file server, home server, mobile server, name server, etc. In some embodiments, device 105 may communicate with server 235 via network 250. Network 250 may be one example of any of networks 110, 115, and/or 120 depicted in FIG. 1.

It is noted that in some embodiments, the device 205 may not include a data sharing module 145. For example, device 205 may include application 220 that allows device 205 to interface with a data sharing module 145 located on another device such as one of device 105 of FIG. 1 and/or server 235. Thus, application 220, via the data sharing module 145, may enable users to view a ranked list of potential recipients with which to share data. In some cases, the ranked list of potential recipients may be displayed on display 210.

In some embodiments, device 205 may be coupled to a database 225. Database 225 may include potential recipient data 230. Potential recipient data 230 may include information regarding potential recipients (e.g., contact information, network communication data, device location data, etc.). Database 225 may be internal or external to the device 205. In one example, device 205 may be coupled directly to database 225, database 225 being internal or external to device 205. In some cases, server 235 may be coupled to database 240. Like database 225, database 240 may include potential recipient data 245. Like database 225, database 240 may include data resulting from analysis of metadata associated with device 205. Accordingly, potential recipient data 230 and/or 245 may include metadata from potential recipients, analyzed data related to potential recipients, scores associated with each potential recipient, and/or a ranked list of potential recipients.

Figure 3:
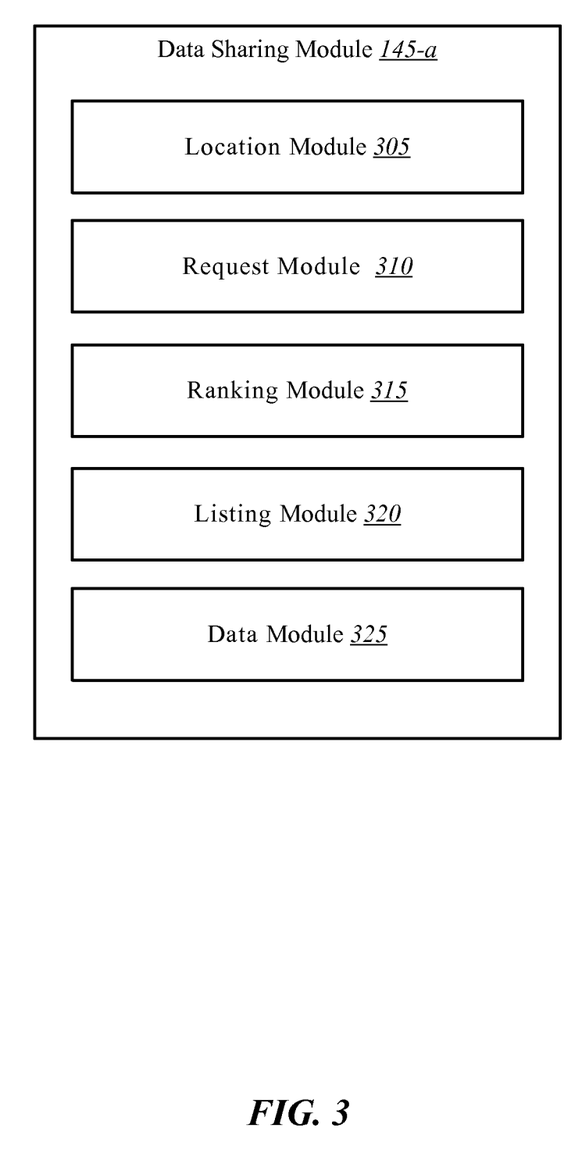
FIG. 3 is a block diagram illustrating one example of a data sharing module.

FIG. 3 is a block diagram illustrating one example of a data sharing module 145-$a$. Data sharing module 145-$a$ may be one example of data sharing module 145 depicted in FIGS. 1 and/or 2. As depicted, data sharing module 145-$a$ may include location module 305, request module 310, ranking module 315, listing module 320, and data module 325.

In one embodiment, location module 305 may determine a location of a computing device. In some cases, the location may be determined based on any combination of a global positioning system (GPS), a local positioning system (LPS), wireless triangulation, etc. Request module 310 may identify a request from the computing device to share data with one or more potential recipients. In some embodiments, ranking module 315 may rank the one or more potential recipients of the data based at least in part on location data of the computing device, location data of a potential recipient, network communication data, contact information associated with the computing device, and/or contact information associated with a potential recipient. The term "potential recipient" may refer to any combination of a user of a device, a user identifier (e.g., email address, phone number, user name, etc.), a computing device (e.g., smartphone, computer tablet, laptop, desktop, server, etc.), and a device identifier (e.g., internet protocol (IP) address, device name, serial number, etc.).

In some cases, a list of potential recipients may be ranked by the ranking module 315 based on a time stamp of the request. Additionally, or alternatively, the ranking module 315 may rank a list of potential recipients based on any combination of the following: distance determined between the computing device and a potential recipient (e.g., via GPS, LPS, etc.); a media share history of the computing device in relation to a potential recipient; one or more available networks within the detectable range of the computing device (i.e., network communication data); one or more available networks within a detectable range of a potential recipient; a match between the contact information associated with the user of the computing device and a potential recipient; and a match between the contact information associated with a potential recipient and the user of the computing device.

In one embodiment, listing module 320 may generate a list of potential recipients based at least in part on the ranking of the one or more potential recipients. Listing module 320 may query the contact information associated with the computing device and/or a potential recipient of the data. The contact information may include address book contact information, call history information, text message history information, social media contact information, and/or a degree of interaction between the user of the computing device and a potential recipient. Degree of interaction may include frequency of contact (e.g., emails, texts, social media posts, shared activities, shared geo-locations, shared calendar appointments, etc.), quantity of contact over a given time period (e.g., contacts per week, etc.), and the like. Degree of interaction may also be based on designated "favorites" in a contact list, contacts designated as family, contacts designated as close friends, etc.

A contact may be identified as a contact of the user stored on the computing device and/or a contact stored on a potential recipient device. Thus, in some cases, the user's contacts may include a potential recipient while the contacts of the potential recipient does not include the user, and vice versa. In some cases, both or neither include contacts of the other. Accordingly, listing module 320 may populate the list of potential recipients in an order based at least in part on a match between the contact information associated with the computing device and/or a potential recipient. Thus, a potential recipient that includes the user as a contact, whether or not an address book of the user's device includes the potential recipient, may be ranked equivalent to the situation where the user's device includes the potential recipient as a contact, whether or not the potential recipient includes the user as a contact.

Listing module 320 may populate the list of potential recipients in an order based at least in part on a time stamp of the request. In some cases, an expiration may be associated with the request. If the listing module 320 determines the request is still fresh, has not expired, etc., then the listing module 320 may continue to populate the list of potential recipients. In some cases, listing module 320 may populate the list of potential recipients in an order based at least in part on an estimated distance between the computing device and a potential recipient. As stated above, the location of the computing device and one or more potential recipients may be determined by any combination of GPS, LPS, wireless triangulation and the like. Accordingly, a first potential recipient determined to be closer to the user than a second potential recipient may be ranked above the second potential recipient in a list of potential recipients.

Listing module 320 may populate the list of potential recipients in an order based at least in part on a media share history of the computing device in relation to a potential recipient (e.g., recentness of an email, text, phone call, or social media post associated with the user and potential recipient, etc.). Thus, a first potential recipient that has communicated more recently with the use of the computing device may be ranked in the list of potential recipients above a second potential recipient that has not communicated with the user of the computing device as recently as the first potential recipient.

Listing module 320 may populate the list of potential recipients in an order based at least in part on one or more available networks within the detectable range of the computing device. Likewise, listing module 320 may populate the list of potential recipients in an order based at least in part on one or more available networks within a detectable range of a potential recipient. The information regarding one or more available networks may include at least one of a signal strength associated with an available network, a cellular tower identifier, a Wi-Fi media access control (MAC) address, and/or a BLUETOOTH® MAC address. If two potential recipients both share an available network with the computing device of the user, in some cases the potential recipient with the stronger signal strength of the two may be ranked above the other potential recipient.

One or more of the ranking criteria described herein may be weighted above another ranking criteria according to user policy. For example, device location may be weighted as more important than available network information. For instance, a first potential recipient may be determined to be closer to the computing device of the user than a second potential recipient. Also, the second potential recipient may share an available network with the computing device of the user, while the first potential recipient does not. However, because location is weighted as more important than available network information, the first potential recipient may be ranked above the second potential recipient even though the first potential recipient is not detected as sharing an available network with the computing device of the user. As another example, the recentness of communication between the user and a potential recipient may be weighted as more important than the degree of interaction between the user of the computing device and a potential recipient. Thus, a first potential recipient detected as communicating with the user more recently than a second potential recipient may be ranked above the second potential recipient even if the second potential recipient has a higher degree of interaction with the user of the computing device than the first potential recipient. Accordingly, any one of the criteria described herein used to rank a potential recipient may be weighted above another one of the same criteria.

In one embodiment, data module 325 may display the list of potential recipients on the computing device. Thus, the user may be enabled to select one or more potential recipients to receive the data requested to be shared. Accordingly, data module 325 may send the data from the computing device to the one or more potential candidates selected from the list of potential recipients.

Figure 4:
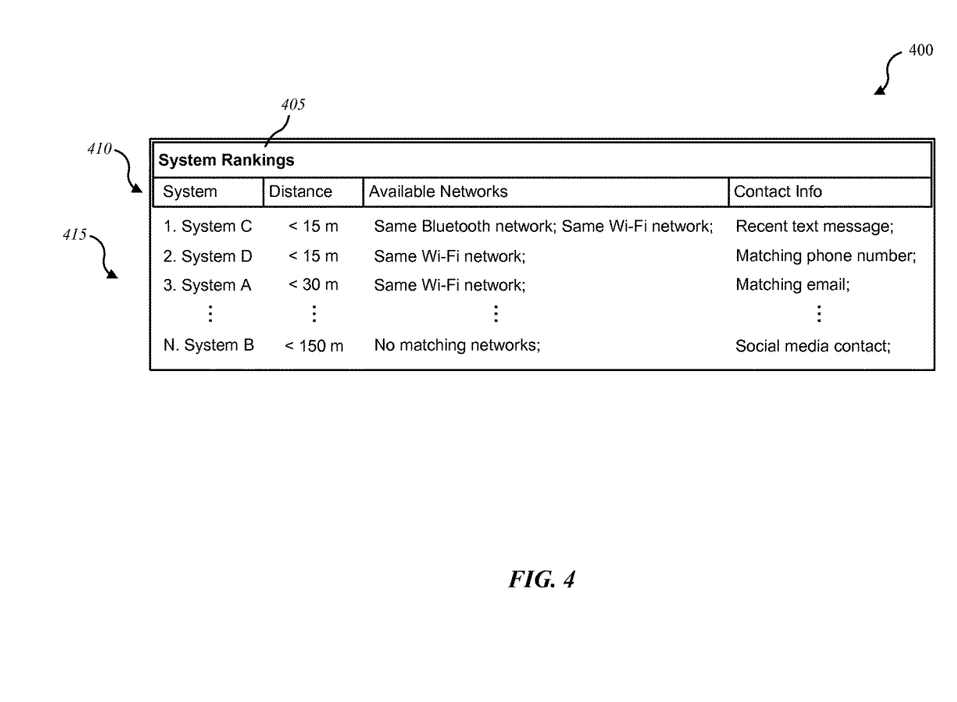
FIG. 4 is a block diagram illustrating one example of system ranking based on metadata associated with multiple devices.

FIG. 4 is a block diagram illustrating one example of system ranking 400 based on metadata associated with multiple devices. System ranking 400 may be based on the ranking of devices 105 and/or device 250 depicted in FIGS. 1 and 2, respectively. Additionally, or alternatively, system ranking 400 may be based on the data collected and analyzed by data sharing module 145-a of FIG. 3. Thus, systems A, B, C, and D illustrated in FIG. 4 may be examples of devices 105 and/or device 250 from FIGS. 1 and 2.

As depicted, system ranking 400 may provide graphical feedback regarding ranked systems. System ranking 400 may be configured with a title bar 405 indicating that the data displayed includes "System Rankings." The data may be sorted and organized according to display headers 410, including system names, system locations (e.g., distance from the device of the user requesting to share data), matching available network information, and matching contact information. The matching contact information may include a degree of interaction and/or a recentness of interaction.

As illustrated, system ranking 400 may include data entries 415 for multiple systems. Based on analysis of metadata from a particular system in relation to a device of a user that initiates a data sharing request, system ranking 400 may rank the systems. Thus, system C may be ranked first in the list of potential recipients. This may be because system C is identified as one of the systems nearest the user (e.g., within 15 meters as illustrated). System D, as depicted, may be detected as being within 15 meters of the user as well. System C may be ranked over system D, however, because system C detects a BLUETOOTH® network also detected by the device of the user, whereas system D only detects a matching Wi-Fi network. Additionally, or alternatively, system C may be ranked over system D because system C is detected as having recent contact with the user (e.g., recent text message). Additionally, system A may be ranked lower because system A is detected as being located farther from the user than systems C and D. Similarly, system B may be ranked lowest because system B is detected as being farthest from the user.

Figure 5:
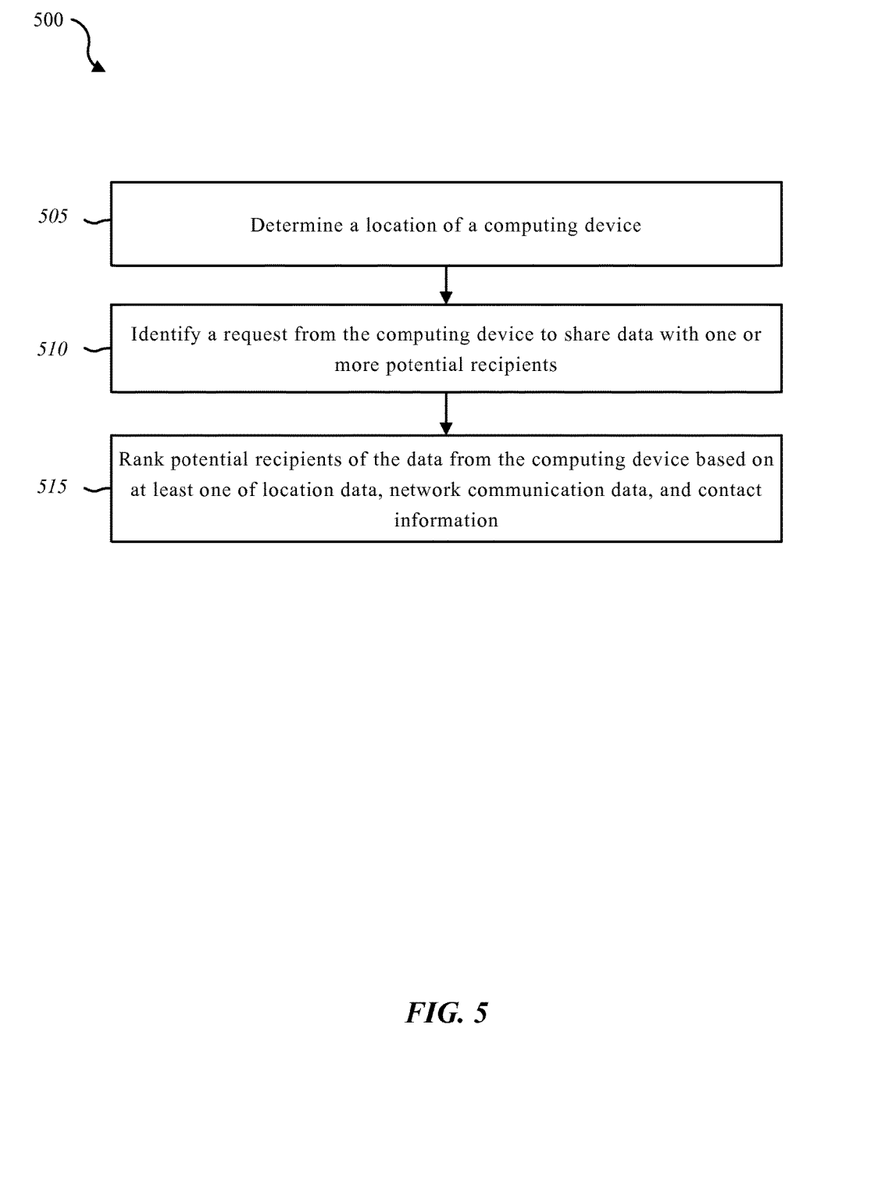
FIG. 5 is a flow diagram illustrating one embodiment of a method for sharing data based on user ranking.

FIG. 5 is a flow diagram illustrating one embodiment of a method 500 for sharing data based on user ranking. In some configurations, the method 500 may be implemented by the data sharing module 145 illustrated in FIGS. 1, 2, and/or 3. In some configurations, the method 500 may be implemented in conjunction with the application 220 and/or the user interface 215 illustrated in FIG. 2.

At block 505, a location of a computing device may be determined. At block 510, a request to share data from the computing device with one or more other computing devices may be identified. At block 515, potential recipients of the data from the computing device may be ranked based on at least one of location data, network communication data, and contact information.

Figure 6:
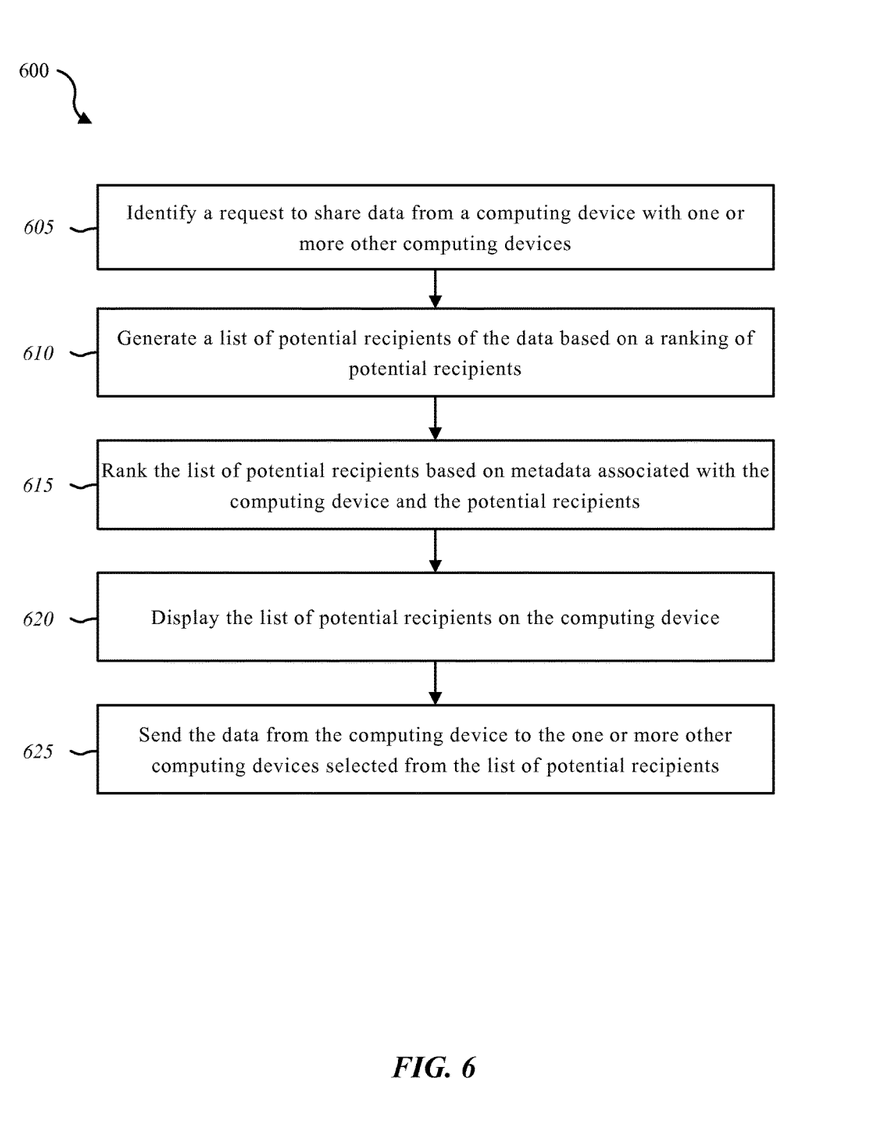
FIG. 6 is a flow diagram illustrating one embodiment of a method for sharing data based on user ranking.

FIG. 6 is a flow diagram illustrating one embodiment of a method 600 for sharing data based on user ranking. In some configurations, the method 600 may be implemented by the data sharing module 145 illustrated in FIGS. 1, 2, and/or 3. In some configurations, the method 600 may be implemented in conjunction with the application 220 and/or the user interface 215 illustrated in FIG. 2.

At block 605, a request to share data from a computing device with one or more other computing devices may be identified. At block 610, a list of potential recipients of the data may be generated based on a ranking of potential recipients. At block 615, the list of potential recipients may be ranked based on metadata associated with the computing device and the potential recipients. At block 620, the list of potential recipients may be displayed on the computing device. At block 625, the data from the computing device may be sent to the one or more other computing devices selected from the list of potential recipients.

Figure 7:
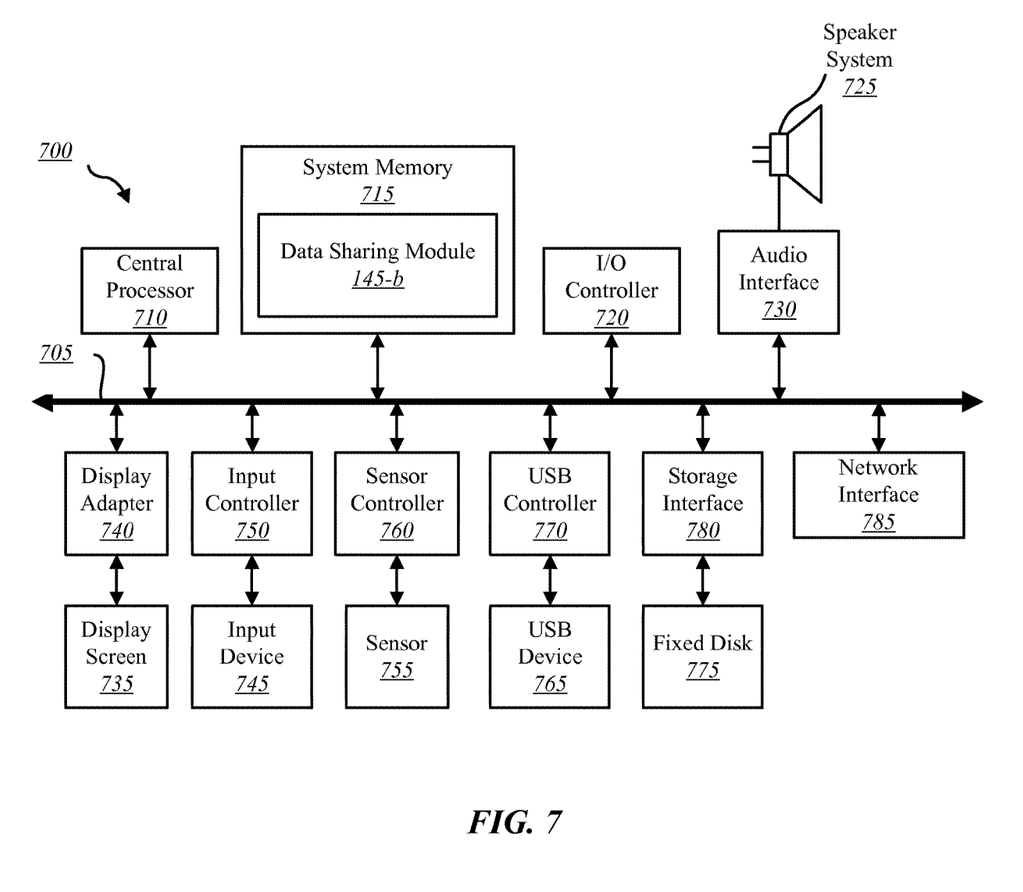
FIG. 7 depicts a block diagram of a computer system suitable for implementing the present systems and methods.

FIG. 7 depicts a block diagram of a controller 700 suitable for implementing the present systems and methods. The controller 700 may be an example of device 105, computing device 150, and/or automation controller 155 illustrated in FIG. 1. In one configuration, controller 700 includes a bus 705 which interconnects major subsystems of controller 700, such as a central processor 710, a system memory 715 (typically RAM, but which may also include ROM, flash RAM, or the like), an input/output controller 720, an external audio device, such as a speaker system 725 via an audio output interface 730, an external device, such as a display screen 735 via display adapter 740, an input device 745 (e.g., remote control device interfaced with an input controller 750), multiple USB devices 765 (interfaced with a USB controller 770), and a storage interface 780. Also included are at least one sensor 755 connected to bus 705 through a sensor controller 760 and a network interface 785 (coupled directly to bus 705).

Bus 705 allows data communication between central processor 710 and system memory 715, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components or devices. For example, the data sharing module 145-b to implement the present systems and methods may be stored within the system memory 715. Applications (e.g., application 220) resident with controller 700 are generally stored on and accessed via a non-transitory computer readable medium, such as a hard disk drive (e.g., fixed disk 775) or other storage medium. Additionally, applications can be in the form of electronic signals modulated in accordance with the application and data communication technology when accessed via interface 785.

Storage interface 780, as with the other storage interfaces of controller 700, can connect to a standard computer readable medium for storage and/or retrieval of information, such as a fixed disk drive 775. Fixed disk drive 775 may be a part of controller 700 or may be separate and accessed through other interface systems. Network interface 785 may provide a direct connection to a remote server via a direct network link to the Internet via a POP (point of presence). Network interface 785 may provide such connection using wireless techniques, including digital cellular telephone connection, Cellular Digital Packet Data (CDPD) connection, digital satellite data connection, or the like. In some embodiments, one or more sensors (e.g., motion sensor, smoke sensor, glass break sensor, door sensor, window sensor, carbon monoxide sensor, and the like) connect to controller 700 wirelessly via network interface 785.

Many other devices or subsystems (not shown) may be connected in a similar manner (e.g., entertainment system, computing device, remote cameras, wireless key fob, wall mounted user interface device, cell radio module, battery, alarm siren, door lock, lighting system, thermostat, home appliance monitor, utility equipment monitor, and so on). Conversely, all of the devices shown in FIG. 7 need not be present to practice the present systems and methods. The devices and subsystems can be interconnected in different ways from that shown in FIG. 7. The aspect of some operations of a system such as that shown in FIG. 7 are readily known in the art and are not discussed in detail in this application. Code to implement the present disclosure can be stored in a non-transitory computer-readable medium such as one or more of system memory 715 or fixed disk 775. The operating system provided on controller 700 may be iOS®, ANDROID®, MS-DOS®, MS-WINDOWS®, OS/2®, UNIX®, LINUX®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present systems and methods may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising." In addition, the term "based on" as used in the specification and the claims is to be construed as meaning "based at least upon."

What is claimed is:

1. A method for sharing data based on user ranking, comprising:
    determining, by a computing device, a location of the computing device;
    identifying, by the computing device, a request from the computing device to share data with a plurality of potential recipients;
    determining, by the computing device, a score for each of the plurality of potential recipients based at least in part on at least one of location data, network communication data, or contact information associated with the computing device; wherein each score is based at least in part on a relationship between a potential recipient and the computing device;
    comparing, by the computing device, the scores of each of the plurality of potential recipients to each other;
    determining, by the computing device, that at least a first score of a first potential recipient matches a second score of a second potential recipient;
    weighting, by the computing device, the score of the plurality of potential recipients based at least in part on a signal strength associated with one or more available networks and based at least in part on the matching determination;
    ranking, by the computing device, the plurality of potential recipients based at least in part on the weighted score of the plurality of potential recipients;
    generating a list of potential recipients based at least in part on the ranking of the plurality of potential recipients;
    displaying the list of potential recipients on the computing device; and
    sending the data from the computing device to one or more potential candidates selected from the list of potential recipients.

2. The method of claim 1, further comprising:
    populating the list of potential recipients based at least in part on a time stamp of the request.

3. The method of claim 1, further comprising:
    querying the contact information associated with the computing device, wherein the contact information comprises any combination of address book contact information, call history information, text message history information, social media contact information, and a degree of interaction between a user of the computing device and a contact.

4. The method of claim 3, further comprising:
populating the list of potential recipients based at least in part on a match between the contact information associated with the computing device and a potential recipient.

5. The method of claim 1, further comprising:
populating the list of potential recipients based at least in part on an estimated distance between the computing device and a potential recipient.

6. The method of claim 1, further comprising:
populating the list of potential recipients based at least in part on a media share history of the computing device in relation to a potential recipient.

7. The method of claim 1, further comprising:
populating the list of potential recipients based at least in part on one or more available networks within the detectable range of the computing device and one or more available networks within a detectable range of a potential recipient.

8. The method of claim 7, wherein the information regarding the one or more available networks includes at least one of a signal strength associated with the available network, a cellular tower identifier, a Wi-Fi media access control (MAC) address, and a Bluetooth MAC address.

9. A computing device configured for sharing data based on user ranking, comprising:
a processor;
memory in electronic communication with the processor, wherein the memory stores computer executable instructions that when executed by the processor cause the processor to perform the steps of:
determining a location of a computing device;
identifying a request to share data from the computing device with one or more other computing devices;
determining a score for each of a plurality of potential recipients based at least in part on at least one of location data, network communication data, or contact information associated with the computing device; wherein each score is based at least in part on a relationship between a potential recipient and the computing device;
comparing the scores of each of the plurality of potential recipients to each other;
determining that at least a first score of a first potential recipient matches a second score of a second potential recipient;
weighting the score of the plurality of potential recipients based at least in part on a signal strength associated with one or more available networks and based at least in part on the matching determination;
ranking potential recipients of the data from the computing device based on the weighted score of the plurality of potential recipients;
generating a list of potential recipients based at least in part on the ranking of the plurality of potential recipients;
displaying the list of potential recipients on the computing device; and
sending the data from the computing device to one or more potential candidates selected from the list of potential recipients.

10. The computing device of claim 9, wherein the instructions executed by the processor cause the processor to perform the steps of:
populating the list of potential recipients based at least in part on a time stamp of the request.

11. The computing device of claim 9, wherein the instructions executed by the processor cause the processor to perform the steps of:
querying contact information associated with the computing device, wherein the contact information comprises any combination of address book contact information, call history information, text message history information, social media contact information, and a degree of interaction between a user of the computing device and a contact.

12. The computing device of claim 11, wherein the instructions executed by the processor cause the processor to perform the steps of:
populating the list of potential recipients based on a match between the contact information associated with the computing device a potential recipient.

13. The computing device of claim 9, wherein the instructions executed by the processor cause the processor to perform the steps of:
populating the list of potential recipients based on a distance determined between the computing device and a potential recipient.

14. The computing device of claim 9, wherein the instructions executed by the processor cause the processor to perform the steps of:
populating the list of potential recipients based on a media share history of the computing device in relation to a potential recipient.

15. The computing device of claim 9, wherein the instructions executed by the processor cause the processor to perform the steps of:
populating the list of potential recipients based on one or more available networks within the detectable range of the computing device and one or more available networks within a detectable range of a potential recipient, wherein the information regarding the one or more available networks includes at least one of a signal strength associated with the available network, a cellular tower identifier, a Wi-Fi media access control (MAC) address, and a Bluetooth MAC address.

16. A non-transitory computer-readable storage medium storing computer executable instructions that when executed by a processor cause the processor to perform the steps of:
determining a location of a computing device;
identifying a request to share data from the computing device with one or more other computing devices;
determining a score for each of a plurality of potential recipients based at least in part on at least one of location data, network communication data, or contact information associated with the computing device; wherein each score is based at least in part on a relationship between a potential recipient and the computing device;
comparing the scores of each of the plurality of potential recipients to each other;
determining that at least a first score of a first potential recipient matches a second score of a second potential recipient;
weighting the score of the plurality of potential recipients based at least in part on a signal strength associated with one or more available networks and based at least in part on the matching determination;
ranking potential recipients of the data from the computing device based on the weighted score of the plurality of potential recipients;

generating a list of potential recipients based at least in part on the ranking of the plurality of potential recipients;

displaying the list of potential recipients on the computing device; and sending the data from the computing device to one or more potential candidates selected from the list of potential recipients.

* * * * *